United States Patent [19]

Braverman

[11] 4,285,902
[45] Aug. 25, 1981

[54] METHOD OF MOLDING A RE-ENFORCED ARTICLE

[75] Inventor: Joseph Braverman, Jerusalem, Israel

[73] Assignee: Rotoplas Ltd., Israel

[21] Appl. No.: 965,142

[22] Filed: Nov. 30, 1978

[30] Foreign Application Priority Data

Dec. 5, 1977 [IL] Israel ..................... 53548

[51] Int. Cl.³ ................... B29D 3/02; B28C 5/04
[52] U.S. Cl. ................... 264/229; 264/263; 264/274; 264/275; 264/278; 264/310
[58] Field of Search ............ 264/231, 229, 275, 277, 264/279, 310, 364, 261, 262, 263, 278, , 46.7, 46.5, 46.6, 46.4, 45.7, 259, 276, 253, 274; 249/96, 97, 213, 215, 85; 52/699, 700, 701, 712; 267/33, 141, 152, 153, 166; 248/559, 619, 620, 621, 634; 29/452

[56] References Cited

U.S. PATENT DOCUMENTS

| Re. 24,914 | 12/1960 | Koenigsberg | 264/46.5 |
|---|---|---|---|
| 2,500,598 | 3/1950 | Axelrod | 264/275 |
| 2,728,127 | 12/1955 | Armstrong | 249/215 |
| 2,865,195 | 12/1958 | Jack | 52/712 |
| 2,994,890 | 8/1961 | Wagner | 264/46.7 |
| 3,081,493 | 3/1963 | Beyer Olsen et al. | 264/275 |
| 3,130,965 | 4/1964 | Johnson | 267/152 |
| 3,131,903 | 5/1964 | Quick | 267/153 |
| 3,157,144 | 11/1964 | Jarnett | 264/46.7 |
| 3,363,870 | 1/1968 | Olson | 267/141 |
| 3,415,924 | 12/1968 | Girardi | 264/277 |
| 3,415,924 | 12/1968 | Giradi | 264/229 |
| 3,675,912 | 7/1972 | Des Vardins | 267/166 |
| 3,785,610 | 1/1974 | Dagiel | 249/214 |
| 3,861,661 | 1/1975 | Yazaki | 267/33 |
| 3,965,234 | 6/1976 | Lane | 264/275 |
| 3,970,733 | 7/1976 | Kraft et al. | 264/263 |
| 4,005,858 | 2/1978 | Lochner | 267/152 |
| 4,154,786 | 5/1979 | Plasse | 264/46.4 |

FOREIGN PATENT DOCUMENTS 616971 7/1935 Fed. Rep. of Germany ............ 267/33

Primary Examiner—James B. Lowe
Attorney, Agent, or Firm—Ostrolenk, Faber, Gerb & Soffen

[57] ABSTRACT

A method of molding an article between a pair of spaced molded walls comprises the steps of releasably attaching a first member to one mold wall, releasably attaching a second member to the other mold wall in alignment with but spaced from the first member, connecting the two spaced members together by a yielding connection, and introducing heated molding material between the two mold walls, whereby when the molded article cools, the yielding connection yields to accommodate shrinkage deformation of the article. Also described is apparatus for use in performing the above method.

7 Claims, 3 Drawing Figures

METHOD OF MOLDING A RE-ENFORCED ARTICLE

BACKGROUND OF THE INVENTION

The invention relates to method and apparatus for re-enforcing rotationally molded elements, particularly useful for thickwall products made of foamed plastics materials.

In the design of rotationally molded products it occasionally happens that certain parts are subjected to stresses higher than others; or that certain parts are inherently of less rigidity and/or strength due to their design, e.g. large-span planar portions.

One way of overcoming this difficulty is to increase the wall thickness of the product. This however, is a costly solution since, as known in the art of rotational molding it is very difficult to form products of varying wall thickness, and normally all the walls would have to be of excessive thickness without serving any useful purpose.

Another way for strengthening or stiffening weak product portions is to make them profiled. This, however, would certainly increase the manufacturing costs of the molding forms.

Still another method, applicable only in certain instances, is to bridge-over a gap between parallel walls so as to form internal contact points or lines through which the two walls would support each other (see FIG. 1). Again, this had requires special modifications of the molds.

BRIEF SUMMARY OF THE INVENTION

It is the general object of the invention to provide method and apparatus for the above-mentioned purposes though not suffering from the numerous drawbacks specified.

According to the present invention, there is provided a method of molding an article having a pair of spaced walls formed by a pair of spaced mold walls, comprising the steps of releasably attaching a first member to one mold wall, releasably attaching a second member to the other mold wall in alignment with but spaced from the first member, connecting the two spaced members together by a yielding connection including a coil spring, introducing molding material between the two mold walls so as to form the article with the two members and the yielding connection embedded in the molding material, whereby the yielding connection yields to accommodate subsequent shrinkage deformation of the article, and releasing the two members from their respective mold walls.

In one described embodiment, the yielding connection consists of a coil spring. In a second described embodiment, it comprises a rigid reinforcing bar including a coil spring at both ends each engaging one of the first and second members.

BRIEF DESCRIPTION OF THE DRAWINGS

These and other features of the invention will become apparent from the ensuing description of two preferred embodiments thereof, given by way of example only, with reference to the attached drawings, wherein.

DESCRIPTION OF PREFERRED EMBODIMENTS OF THE INVENTION

Figure 1:
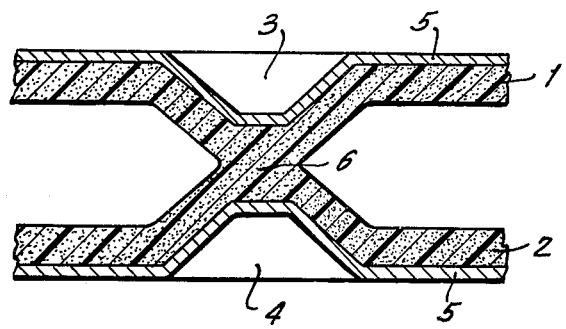
FIG. 1 illustrates a known re-enforcing method.

In FIG. 1 there is shown a product portion having a first planar wall 1 of foamed plastics, and a second wall 2 extending parallel to the wall 1. By forming oppositely located depressions 3 and 4 in mold walls 5, the walls 1 and 2 become engaged with each other and fused together at the region 6. This contact between the walls acts as a rigid distance-piece, for re-enforcing the respective area of the product.

Instead of the special mold design, the same result could have been achieved by completely filling the inner space between the mold walls 5, however, at the expense of extra materials.

Figure 2:
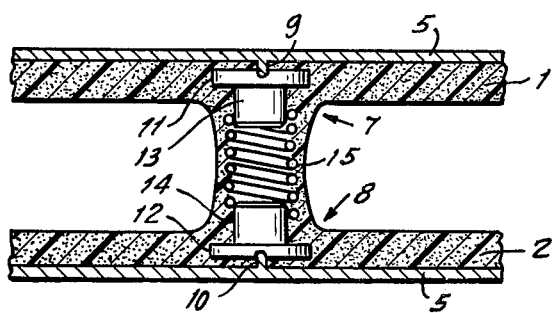
FIG. 2 is a cross-sectional view of a re-enforcing arrangement according to the invention, substituting that of FIG. 1.

In the arrangement of FIG. 2 the same walls 1 and 2 are spacedly interconnected during the rotational forming thereof by a pair of embedded inserts 7 and 8, which may be temporarily supported at their appropriate places by small studs 9 and 10 projecting from the inner surfaces of the mold walls 5, and fitting into suitable holes formed in inserts 7 and 8, respectively.

The inserts 7, 8 are of metal, having head portions 11, 12 and stems 13, 14, onto which a coil spring 15 is fixed as shown.

It will thus be seen that inserts 7 and 8 are releasably attachable to the two mold walls 1 and 2, with insert 8 in alignment with but spaced from insert 7. Spring 15 serves as a yielding connection connecting the two spaced inserts 7 and 8. Thus, when heated molding material is introduced between the two mold walls 1 and 2 so as to form the article, the two inserts 7 and 8, as well as the spring 15 become embedded within the molding material, so that as the molded article cools the spring 15 yields to accommodate shrinkage deformation between inserts 7 and 8 of the article.

Figure 3:
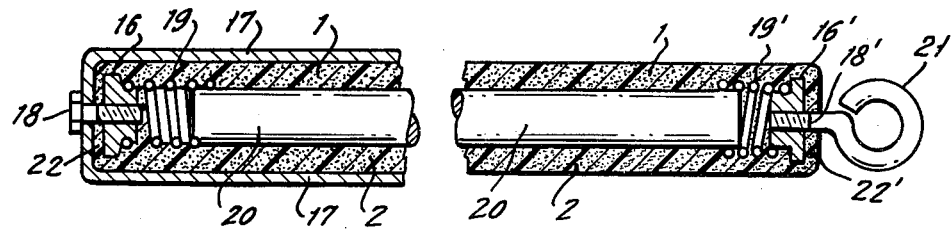
FIG. 3 illustrates a modified arrangement, wherein the left-hand section illustrates the product when still within the mold plates and the right-hand section illustrates the product after having been removed from the mold plates.

The arrangement of FIG. 3 is designed for bearing external loads, such as a bending force acting on an elongated product portion (e.g. the weight of a motor on the transom beam of a rotationally molded boat).

The arrangement comprises (see left side of FIG. 3) a first insert 16 spacedly held within a mold 17 by a bolt 18. A spring 19 is fixed at one end thereof to the insert 16 and at the other end to a rod 20, the rod being held in suspension by a similar arrangement (not shown) at the opposite end. Thus, when the molding material is introduced into the mold, it embeds the rod 20, as well as the insert 16, bolt 18 and spring 19 at its two ends, the molding material at both ends also passing into the space 22 between the inner face of the mold end wall and the outer face of insert 16.

Immediately after moulding the walls 1 and 2, the bolts 18 (at both sides) would be released and the whole assembly would be free to shrink, whereby the springs 19, forming yielding connections between the two inserts 16 and the rod 20 yields (by compaction of the spring coils) to accommodate shrinkage deformation of the article.

The tapped bore of each insert 16 may afterwards serve for fastening means such as of a hook or eye bolt 21. This is more clearly illustrated in the right-hand section of FIG. 3 showing the shank 18' of a bolt 21 being received within the tapped bore through the end wall 22' and the insert 16', FIG. 3 also illustrating the compacted spring at 19'.

It should be noted that, were it not for the flexible suspension of the rod 20, the shrinkage of the product walls would have caused deformation or even bursting of the sidewalls 22.

Furthermore, it has been found advisable to pre-tension the springs 19, 19'—through the tightening of the bolts 18—so that after the solidification of the plastics such pre-tension would be relieved by the compaction of the springs during the cooling of the article.

While the invention has been illustrated in relation to specific embodiments, those skilled in the art to which the invention pertains will appreciate that many variations and modifications may be applied without departing from the spirit and scope thereof and as defined in the appended claims.

What is claimed is:

1. A method of molding an article having a pair of spaced walls in a mold formed by a pair of spaced mold walls, wherein the molded article is strengthened and is able to compensate for shrinkage deformation, comprising the steps:
   (a) releasably attaching a first member to one mold wall;
   (b) releasably attaching a second member to the other mold wall in alignment with but spaced from the first member;
   (c) connecting the two spaced members together by yielding means including a coil spring;
   (d) while the first and second members are releasably attached to their respective mold walls and the yielding means is connecting them, introducing molding material between the two mold walls so as to form the article with the two members and the yielding means embedded in the molding material,
   (e) then releasing the two members from their respective releasable attachments to the mold walls;
   whereby, as the molded article solidifies, it is freed from the mold walls to deform as it shrinks and the yielding means yields to accommodate subsequent shrinkage deformation of the article while the embedded inserts and yielding means help strengthen the molded article.

2. The method according to claim 1, wherein said yielding means consists of said coil spring.

3. The method according to claim 2, wherein said coil spring is pre-tensioned such that shrinkage deformation of the molded article relieves the pre-tension of the spring.

4. The method according to claim 1, wherein said yielding means comprises a rigid reinforcing bar carrying said coil spring at one end engaging one of said first and second members.

5. The method according to claim 4, wherein said reinforcing bar includes a said coil spring at both ends each engaging one of said first and second members.

6. The method according to claim 1, wherein said releasable members are inserts formed with holes releasably receiving studs projecting from the inner surfaces of the mold walls.

7. The method according to claim 1, wherein said releasable members are inserts formed with tapped bores releasably receiving bolts threaded into the mold walls, said tapped bores being capable of later serving to receive fastening means for the completed molded article.

* * * * *